(12) United States Patent
Kelly

(10) Patent No.: US 12,552,510 B1
(45) Date of Patent: Feb. 17, 2026

(54) THERMAL MANAGEMENT SYSTEMS FOR MARINE VESSELS

(71) Applicant: Brunswick Corporation, Mettawa, IL (US)

(72) Inventor: Brennan J. Kelly, Urbana, IL (US)

(73) Assignee: Brunswick Corporation, Mettawa, IL (US)

( * ) Notice: Subject to any disclaimer, the term of this patent is extended or adjusted under 35 U.S.C. 154(b) by 505 days.

(21) Appl. No.: 17/977,570

(22) Filed: Oct. 31, 2022

(51) Int. Cl.
| | |
|---|---|
| *B63H 21/38* | (2006.01) |
| *B63H 20/00* | (2006.01) |
| *F01P 3/20* | (2006.01) |
| *F28D 1/02* | (2006.01) |
| *H01M 10/625* | (2014.01) |

(52) U.S. Cl.
CPC ......... *B63H 21/383* (2013.01); *B63H 20/001* (2013.01); *F01P 3/202* (2013.01); *F28D 1/022* (2013.01); *H01M 10/625* (2015.04)

(58) Field of Classification Search
CPC ..... B63H 21/383; B63H 20/001; F01P 3/202; F01P 3/207; F28D 1/022; H01M 2220/20
See application file for complete search history.

(56) References Cited

U.S. PATENT DOCUMENTS

| | | |
|---|---|---|
| 3,721,104 A | 3/1973 | Adler |
| 4,226,606 A | 10/1980 | Yaeger et al. |
| 4,617,472 A | 10/1986 | Slavik |
| 5,004,042 A | 4/1991 | McMorries et al. |
| 5,599,217 A | 2/1997 | Ferrante |
| 5,746,270 A | 5/1998 | Schroeder et al. |
| 5,848,536 A | 12/1998 | Dodge |
| 6,273,771 B1 | 8/2001 | Buckley et al. |

(Continued)

FOREIGN PATENT DOCUMENTS

| | | |
|---|---|---|
| CN | 102407931 B | 11/2013 |
| CN | 205930240 U | 2/2017 |

(Continued)

OTHER PUBLICATIONS

Search Report in corresponding Application No. GB2405641.8, dated Sep. 16, 2024, 5 pages.

(Continued)

*Primary Examiner* — Andrew Polay
(74) *Attorney, Agent, or Firm* — Andrus Intellectual Property Law, LLP

(57) ABSTRACT

A thermal management system for a marine vessel. The thermal management system includes an open loop circuit and a pump that pumps water from the body of water, through the open loop circuit, and back to the body of water. The thermal management system further includes a closed loop circuit including a first path and a second path parallel to each other. Another pump pumps a heat transfer fluid through the closed loop circuit. One heat exchanger exchanges heat between the water and the heat transfer fluid. A second heat exchanger exchanges heat with the heat transfer fluid. A component is cooled or heated by the heat transfer fluid. One or more valves select between conveying the heat transfer fluid via the second path to the second heat exchanger and via the first path to bypass the second heat exchanger to vary the cooling or heating of the component.

20 Claims, 12 Drawing Sheets

(56) References Cited

U.S. PATENT DOCUMENTS

| | | |
|---|---|---|
| 6,525,431 B1 | 2/2003 | Clucas |
| 6,612,504 B2 | 9/2003 | Sendzik |
| 7,066,777 B2 | 6/2006 | Maseltee |
| 7,089,955 B1 | 8/2006 | Komro, Sr. |
| 7,094,118 B1 | 8/2006 | Phillips et al. |
| 7,150,664 B1 | 12/2006 | Uppgard |
| 7,156,709 B1 | 1/2007 | Staerzl et al. |
| 7,172,831 B2 | 2/2007 | Kumar et al. |
| 7,255,616 B1 | 8/2007 | Caldwell |
| 7,264,520 B1 | 9/2007 | Taylor et al. |
| 7,284,710 B2 | 10/2007 | Rixen |
| 7,416,456 B1 | 8/2008 | Gonring et al. |
| 7,467,595 B1 | 12/2008 | Lanyi et al. |
| 7,503,819 B1 | 3/2009 | Jaeger et al. |
| 7,569,954 B2 | 8/2009 | Tölle et al. |
| 7,789,176 B2 | 9/2010 | Zhou |
| 7,975,637 B1 | 7/2011 | Nida |
| 8,011,982 B1 | 9/2011 | Baier |
| 8,043,132 B1 | 10/2011 | Wyant |
| 8,137,146 B2 | 3/2012 | Cohen |
| 8,298,025 B2 | 10/2012 | Eichinger |
| 8,336,319 B1 | 12/2012 | Johnston et al. |
| 8,403,234 B2 | 3/2013 | Wolter |
| 8,500,501 B1 | 8/2013 | Taylor |
| 8,535,104 B1 | 9/2013 | Nida |
| 8,763,566 B1 | 7/2014 | Taylor et al. |
| 8,864,538 B1 * | 10/2014 | Arbuckle ............ B63H 21/383 440/88 P |
| 8,944,865 B1 | 2/2015 | Krabacher et al. |
| 9,234,450 B2 | 1/2016 | England et al. |
| 9,248,898 B1 | 2/2016 | Kirchhoff et al. |
| 9,359,057 B1 | 6/2016 | Andrasko et al. |
| 9,403,588 B1 | 8/2016 | George et al. |
| 9,446,828 B1 | 9/2016 | Groeschel et al. |
| 9,446,830 B2 | 9/2016 | Hartmeyer et al. |
| 9,505,307 B2 | 11/2016 | Champagne et al. |
| 9,680,190 B1 | 6/2017 | Xia |
| 9,758,010 B2 | 9/2017 | Johnston |
| 9,802,459 B2 | 10/2017 | Kamps et al. |
| 9,802,687 B2 | 10/2017 | Davis et al. |
| 9,815,539 B1 | 11/2017 | Provost |
| 9,975,619 B1 | 5/2018 | Gonring |
| 9,994,296 B1 | 6/2018 | Balogh et al. |
| 10,047,661 B1 | 8/2018 | Torgerud |
| 10,151,539 B2 | 12/2018 | Kamps et al. |
| 10,184,684 B2 | 1/2019 | Kurelowech |
| 10,336,429 B1 | 7/2019 | Amerling et al. |
| 10,366,429 B2 | 7/2019 | Amerling et al. |
| 10,378,423 B1 | 8/2019 | Reichardt et al. |
| 10,408,548 B2 | 9/2019 | Bell et al. |
| 10,495,025 B2 | 12/2019 | Bell et al. |
| 10,594,510 B1 | 3/2020 | Arbuckle et al. |
| 10,889,205 B2 | 1/2021 | Hettrich |
| 10,890,098 B1 | 1/2021 | Kurzynski et al. |
| 10,967,702 B2 | 4/2021 | Mancini |
| 11,072,408 B1 | 7/2021 | Kurzynski et al. |
| 11,214,114 B2 | 1/2022 | Smith |
| 11,286,027 B1 | 3/2022 | Dharmadhikari et al. |
| 11,293,335 B1 | 4/2022 | Radavich et al. |
| 11,352,937 B1 | 6/2022 | Dreyer et al. |
| 11,358,434 B2 | 6/2022 | Porras |
| 2002/0079376 A1 | 6/2002 | R Enander |
| 2003/0226904 A1 | 12/2003 | Haklander |
| 2006/0130888 A1 | 6/2006 | Yamaguchi et al. |
| 2007/0147809 A1 | 6/2007 | Rixen |
| 2010/0279153 A1 | 11/2010 | Payne |
| 2012/0152186 A1 * | 6/2012 | Sujan .................. F01P 3/20 123/41.31 |
| 2012/0180997 A1 | 7/2012 | Johnston |
| 2016/0059949 A1 | 3/2016 | Rebele et al. |
| 2016/0107505 A1 | 4/2016 | Johnston |
| 2018/0178615 A1 | 6/2018 | Xia |
| 2018/0354339 A1 | 12/2018 | Smith et al. |
| 2018/0372334 A1 | 12/2018 | Walker |
| 2019/0176572 A1 | 6/2019 | Kim |
| 2019/0383563 A1 | 12/2019 | He et al. |
| 2020/0255112 A1 | 8/2020 | Doremus et al. |
| 2020/0370463 A1 | 11/2020 | Saruwatari |
| 2021/0197692 A1 | 7/2021 | Hettrich |
| 2022/0097484 A1 | 3/2022 | Rixens |
| 2022/0111700 A1 | 4/2022 | Henderson |
| 2022/0115719 A1 | 4/2022 | King |
| 2023/0242230 A1 | 8/2023 | Nakagawa |

FOREIGN PATENT DOCUMENTS

| | | |
|---|---|---|
| CN | 108482064 A | 9/2018 |
| CN | 209441180 U | 9/2019 |
| CN | 110588277 A | 12/2019 |
| CN | 112678139 A | 4/2021 |
| CN | 112682157 | 4/2021 |
| CN | 112682157 A | 4/2021 |
| CN | 213743657 U | 7/2021 |
| CN | 114523816 A | 5/2022 |
| DE | 102009056027 | 1/2014 |
| DE | 102021131215 A1 | 6/2022 |
| EP | 2044370 | 4/2009 |
| EP | 2907739 A1 | 8/2015 |
| EP | 3454401 | 5/2021 |
| GB | 2388184 A | 11/2003 |
| JP | 2006103537 A | 4/2006 |
| JP | 2014239607 A | 12/2014 |
| KR | 20170021142 A | 2/2017 |
| KR | 20210015197 A | 2/2021 |
| KR | 102542738 B1 | 6/2023 |
| WO | 2010102606 | 9/2010 |
| WO | 2011005775 | 1/2011 |
| WO | 2013029808 | 3/2013 |
| WO | 2013124610 A2 | 8/2013 |
| WO | 2021055758 A1 | 3/2021 |

OTHER PUBLICATIONS

Search Report in corresponding Application No. EP24171732.1, dated Oct. 9, 2024, 8 pages.

Whale RV Catalog, pp. 8-9, https://www.delzer.com/navico/whale-rv-catalog/8/, accessed Apr. 13, 2023.

Dharmadhikari et al., "Marine Drives And Marine Vessels Having Cooling Systems", U.S. Appl. No. 17/978,758, filed Nov. 1, 2022 (drawings, specification, and claims only).

Dharmadhikari et al., "Thermal Management Systems And Methods For Thermally Managing Components For Marine Vessels", U.S. Appl. No. 17/900,470, filed Aug. 31, 2022 (drawings, specification, and claims only).

Dharmadhikari et al., "Thermal Management Systems For Marine Vessels", U.S. Appl. No. 17/988,104, filed Nov. 16, 2022 (drawings, specification, and claims only).

Denso, Heat Pump Air-Conditioning System, https://www.denso.com/global/en/business/products-and-services/mobility/pick-up/hpacs/, accessed Apr. 13, 2023.

Naik et al., "Marine Propulsion System And Method For Wake Control", U.S. Appl. No. 17/903,938, filed Sep. 6, 2022 (drawings, specification, and claims only).

Kuuma 11 Gallon Marine Water-Heater 120V Front Heat Exchanger Front/Bak Mount, Camco Marine, https://www.camcomarine.com/products/11-gal-water-heater-120v-front-heat-exch-fr-back-mount, accessed Nov. 10, 2023.

Witte, "Cooling System For A Marine Vessel", U.S. Appl. No. 18/053,513, filed Nov. 8, 2022 (drawings, specification, and claims only).

* cited by examiner

THERMAL MANAGEMENT SYSTEMS FOR MARINE VESSELS

FIELD

The present disclosure generally relates to thermal management systems for marine vessels.

BACKGROUND

The following U.S. Patents provide background information and are incorporated by reference in entirety.

U.S. Pat. No. 7,975,637 discloses a method and apparatus for controlling the temperature of batteries in a hybrid marine vessel utilizing a compartment to store the batteries and various conduits to conduct air to and from that compartment. A heat exchanger can draw air from the compartment and cool the air for use in the cabin of the marine vessel. The air from the cabin can be directed into the compartment to provide a flow of air that carries heat away from the batteries in the compartment and toward the heat exchanger.

U.S. Pat. No. 8,864,538 discloses systems and methods for cooling a marine propulsion system on a marine vessel. A lift pump pumps raw cooling water from a body of water in which the marine vessel is situated. The lift pump pumps the raw cooling water through an open cooling circuit from an upstream inlet for receiving the raw cooling water to a downstream outlet for discharging the cooling water back to the body of water. A control circuit controls operation of the lift pump. At least one sensing device indicates whether the lift pump is connected to the body of water. The sensing device is in communication with the control circuit. The control circuit prevents operation of the lift pump when the sensing device indicates that the lift pump is not connected to the body of water.

U.S. Pat. No. 9,403,588 discloses systems for cooling a marine engine operated in a body of water. The systems can include an open loop cooling circuit for cooling the marine engine. The open loop cooling circuit is configured to convey cooling water from the body of water to the marine engine so that heat is exchanged between the cooling water and the marine engine. A pump is configured to pump the cooling water from upstream to downstream through the open loop cooling circuit. A heat exchanger is configured to cause an exchange of heat between the cooling water located upstream of the marine engine and the cooling water located downstream of the marine engine to thereby warm the cooling water located upstream of the marine engine, prior to cooling the marine engine.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

One embodiment of the present disclosure generally relates to a thermal management system for a marine vessel. The thermal management system includes an open loop circuit and a first pump that pumps water from the body of water in which the marine vessel is operating, through the open loop circuit, and back to the body of water. The thermal management system further includes a closed loop circuit including a first path and a second path parallel to each other, as well as a second pump that pumps a heat transfer fluid through the closed loop circuit. A first heat exchanger is configured to exchange heat between the water and the heat transfer fluid. A second heat exchanger is configured to exchange heat with the heat transfer fluid. A component cooled or heated by the heat transfer fluid. One or more valves are configured to select between conveying the heat transfer fluid via the second path of the closed loop circuit to the second heat exchanger and via the first path in the closed loop circuit to bypass the second heat exchanger to vary the cooling or heating of the component.

Another embodiment of the present disclosure generally relates a thermal management system for a marine vessel. The thermal management system includes an open loop circuit and a first pump that pumps water from the body of water in which the marine vessel is operating, through the open loop circuit, and back to the body of water. The thermal management system further includes a closed loop circuit including a first path and a second path parallel to each other. A second pump pumps a heat transfer fluid through the closed loop circuit. A heat exchanger is configured to exchange heat between the water and the heat transfer fluid. A radiator is configured to exchange heat between the heat transfer fluid and atmosphere. A battery and a battery charger are each cooled or heated by the heat transfer fluid. One or more valves are configured to select between conveying the heat transfer fluid via the second path of the closed loop circuit to the radiator and via the first path in the closed loop circuit to bypass the radiator to vary the cooling or heating of the component. A control system is configured to operate the one or more valves based upon whether the marine vessel is out of the body of water and whether the battery charger is charging the battery.

Various other features, objects and advantages of the disclosure will be made apparent from the following description taken together with the drawings.

BRIEF DESCRIPTION OF THE DRAWINGS

The present disclosure is described with reference to the following Figures.

DETAILED DISCLOSURE

The present disclosure generally relates to thermal management systems for marine vessels. As discussed further below, these thermal management systems include separate circuits through which heat transfer fluids are pumped for cooling or heating components with each respective circuit. The heat transfer fluid of one circuit can be selectively used to provide additional cooling or heating for the components of the other circuit as needed. It should be recognized that the heat transfer fluids disclosed herein may be liquids, gases, or a combination of both. It should also be recognized that while the present disclosure generally provided examples of thermal management system 10 used in conjunction with marine vessels, other uses and context are also contemplated, including recreational vehicles (RVs) and other vehicles having components requiring cooling and/or heating.

Figure 1:
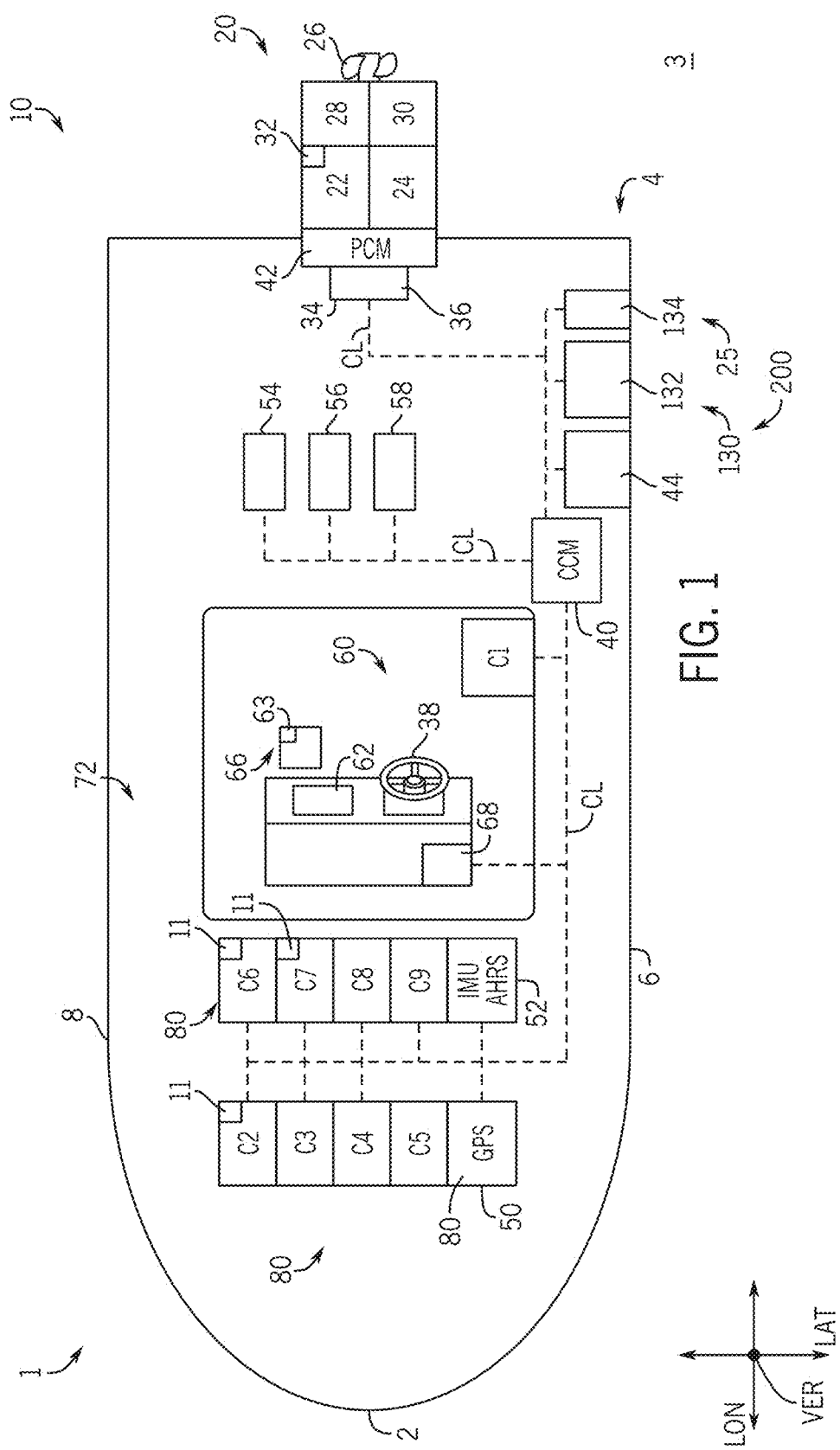
FIG. 1 is a top view of a marine vessel incorporating a thermal management system according to the present disclosure.

FIG. 1 shows a thermal management system 10 for a marine vessel 1 according to the present disclosure. The marine vessel 1 extends between a bow 2 and a stern 4 along a longitudinal axis LON and between a port side 6 and starboard side 8 along a latitudinal axis LAT perpendicular to the longitudinal direction LON (each also being perpendicular to the vertical axis VER). The marine vessel 1 is propelled through a body of water 3 by a marine propulsion device 20, which while shown as an outboard motor could also be an inboard motor, stern drive, pod drive, and/or jet drive. The marine propulsion device 20 includes a powerhead 22, which may be an internal combustion engine (e.g., gasoline or diesel engines), an electric motor, and/or a hybrid of the two. A propeller 26 is coupled in torque-transmitting relationship with each powerhead 22 to generate propulsion in the water. The rotational engagement between the powerhead 22 and the propeller 26 is provided through a multi-speed transmission 28 and gearset 30 in a manner known in the art. The marine propulsion device 20 further includes a powerhead speed sensor 32 that measures a speed of the powerhead 22 in a conventional manner.

A steering actuator 34 is operable to steer the marine propulsion device 20 in accordance with commands from a steering input device such as a steering wheel 38. The steering actuator 34 may be hydraulically, pneumatically, and/or electromechanically operated such as those discussed in U.S. Pat. Nos. 7,150,664; 7,255,616; and 7,467,595, which are incorporated by reference herein. Similarly, a trim actuator 36 is operable to adjust a trim angle of the marine propulsion device 20 in a manner known in the art. The trim actuator 36 may be hydraulically, pneumatically, and/or electromechanically operated such as those discussed in U.S. Pat. Nos. 6,583,728; 7,156,709; 7,416,456; and 9,359,057, which are incorporated by reference herein.

With continued reference to FIG. 1, a central control module 40 (or CCM) is provided in signal communication with a propulsion control module 42 of the marine propulsion device 20, as well as with other devices discussed herein. Although FIG. 1 shows one central control module 40, the present disclosure contemplates configurations in which multiple central control modules work together, serially and/or in parallel (e.g., providing a central control module for each of multiple marine propulsion devices 20). Likewise, it should be recognized that the lines CL shown to represent both communication and power connections are merely examples.

A power system 25 provides electric power various devices within the marine vessel 1, including the powerhead 22 in the case of an electric or hybrid powerhead. By way of example, the power system 25 may include batteries and/or other power storage devices, chargers, inverters (e.g., DC-AC inverters, AC-DC inverters), converters (e.g., DC-DC converters), and power distribution systems. The devices within the power system 25 may be provided as local power system 24 positioned with the marine propulsion device 20, a central power system 44 positioned in the marine vessel 1, or a combination thereof.

Another device powered by the power system 25 is a global positioning system (GPS) 50 that provides location and speed of the marine vessel 1 to the central control module 40. The power system 25 also powers an inertial measurement unit (IMU) or an attitude and heading reference system (AHRS) (collectively shown as the IMU/AHRS 52). An IMU has a solid state, rate gyro electronic compass that indicates the vessel heading and solid-state accelerometers and angular rate sensors that sense the vessel's attitude and rate of turn. Further devices powered by the power system 25 include one or more valves 54, pumps 56, and fans 58 within the thermal management system 10, which provide heating and cooling for devices as discussed below. The valves 54 are not limited to being opened or closed and the pumps 56 and fans 58 are not limited to operating or not operating (i.e., either maybe variable to throttle rates, pressures, and the like).

With continued reference to FIG. 1, the marine vessel 1 includes a helm 60 having a number of operator input devices for controlling various functions of the thermal management system 10 and the marine vessel 1 more generally. The operator input devices at the helm 60 include a multi-functional display device 62 including a user interface, such as an interactive, touch-capable display screen, a keypad, a display screen and keypad combination, and/or any other interfaces known in the art. By way of example, the display device 62 may be part of a VesselView® onboard management system by Mercury Marine Corporation of Fond du Lac, Wisconsin. The operator input devices further include one or more steering devices, such as the steering wheel 38 and/or a joystick, configured to facilitate user input for steering the marine vessel 1 (e.g., via the central control module 40, the propulsion control modules 42, and/or a helm controller 68 in a manner known in the art). A throttle lever 66 is also provided as an operator input device for providing thrust commands to the central control module 40. Additional information relating to input devices and related control is provided in U.S. Pat. Nos. 9,248,898; 9,975,619; 9,994,296; and 10,594,510; which are incorporated by reference herein.

The helm 60 of the marine vessel 1 is positioned in a cockpit 70, which in FIG. 1 is positioned above a cabin 72. Various devices are positioned within the cockpit 70 and within the cabin 72 that require heating and/or cooling depending on usage, which may also be referenced as components 80. Some of the components 80 of FIG. 1 are separately identified as components C1-C9 for further discussion. Component C1 is an HVAC system for the cockpit 70, which requires heating when controlled to heat the cockpit 70 and cooling when controlled to cool the cockpit 70. Components C2-C5 are used in conjunction with the cabin 72. Component C2 is an HVAC system for the cabin 72 that, like the HVAC system for the cockpit 70, requires heating when controlled to heat the cabin 72 and cooling when controlled to cool the cabin 72. Component C3 is a refrigerator and thus only requires cooling (also referred to as being a heat "source"). Component C4 is a freezer and thus, like component C3, requires only cooling. Component C5 is a water heater, thereby requiring only heating (also referred to as being a heat "sink"). The sixth component C6 is a battery, the seventh component C7 is a battery charger, the eighth component C8 is a heater, and the ninth component C9 is a DC-DC converter. Components C6-C9 may be part of the power local power systems 24 integrated with the marine propulsion devices 20, the central power system 44 positioned in the marine vessel 1, or a combination thereof. The components 80 to be heated or cooled by the thermal management system 10 may include other heat sources, heat sinks, or combinations thereof associated with the marine propulsion device 20 or marine vessel 1. By way of example, these other components 80 may include the powerhead 22, multi-speed transmission 28, or portions of the power system 25.

The present inventors have recognized problems with the heating and cooling of components for marine vessels presently known in the art. In particular, marine vessels are becoming increasingly electrified, such as incorporating electric or hybrid powerheads that are powered by batteries for generating propulsion in the body of water. This requires the batteries to be charged much in the same manner as a cellular phone to ensure readiness for the next use. However, unlike cellular phones, the batteries and/or battery chargers in the context of a marine vessel require extensive cooling, which in the art is presently provided by using raw water from the body of water in which the marine vessel is typically operated. The need for active cooling is further exacerbated by the ever-increasing speeds and voltages of charging, which may be 240 V. 480 V, or 800 V (with currents ranging from 20 to 50 Amps). Examples of "DC Fast" charging include Tesla, Inc.'s Supercharger and the CCS Type 2 charging standard.

The present inventors have recognized that the reliance on raw water for cooling electronic components such as the battery and battery charger therefore requires the marine vessel to be the water whenever this cooling is needed (e.g., whenever the battery charger is charging the battery). It is often advantageous to remove the marine vessel from the water, such as for the safety and security of the marine vessel, to perform maintenance and repairs, and to prevent unnecessary additional fouling and corrosion when the marine vessel is not in use. This may include lifting the marine vessel into a shore station or boat houses. In other cases, the marine vessel may be preferably trailered when not in use. However, charging for marine vessels presently known in the art instead necessitates leaving the marine vessel in the water overnight (or for other extended durations) rather than being able to remove the marine vessel after use. In this manner, the ability to charge via DC fast charging or charge at other significant rates is very limited with systems and methods presently known in the art. This system also may be utilized when the coolant medium for the raw water circuit is warmer than what is desired to appropriately cool down components to their intended operating temperatures, in which case the radiator and/or a heat pumping system could be used as supplemental cooling devices.

Figure 2:
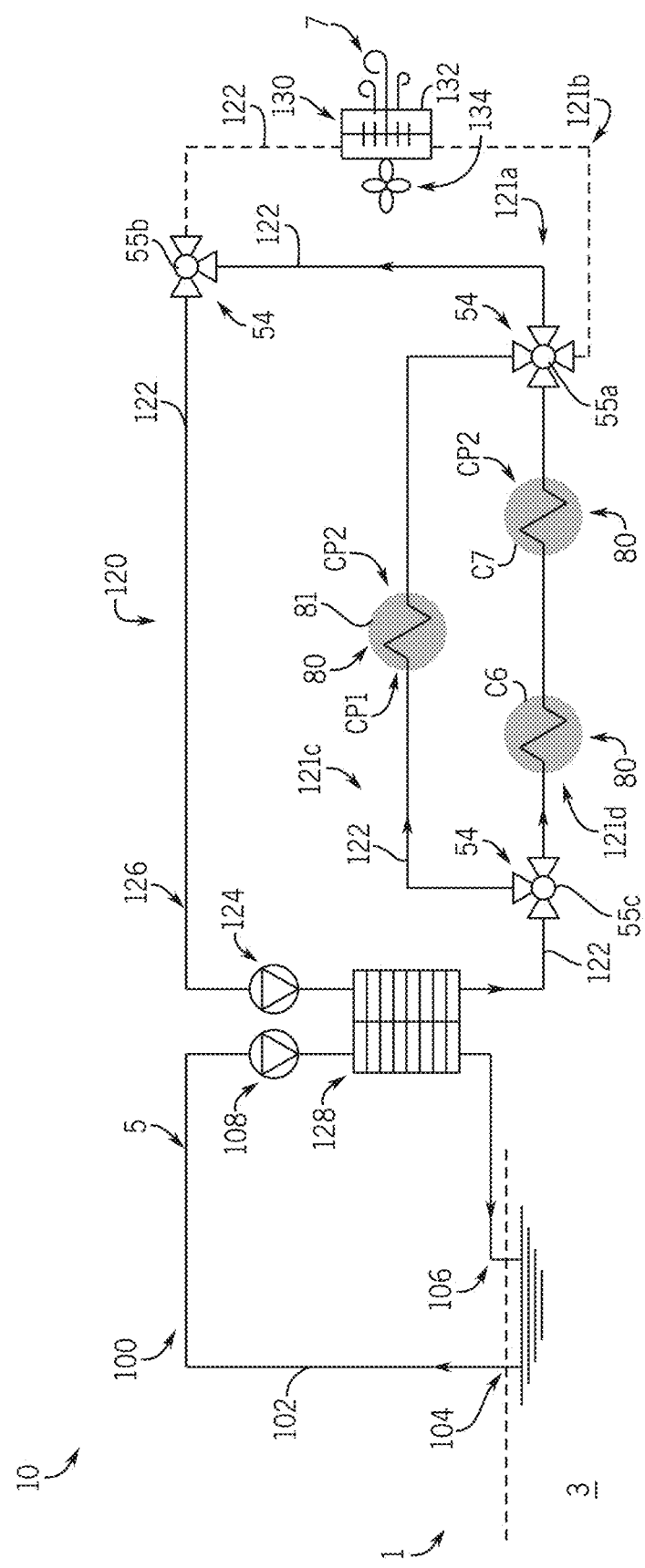
FIG. 2 is schematic view of one embodiment of a thermal management system according to the present disclosure in a first operating mode.

FIG. 2 shows one thermal management system 10 for heating and cooling across the components 80 of a marine vessel according to the present disclosure. It should be recognized that the components 80 discussed herein may be positioned within the marine propulsion devices 20, the marine vessel 1, or a combination of both. A valve 130 is provided within the first The thermal management system 10 includes an open loop circuit 100 that extends via conduits 102 between an inlet 104 and an outlet 106. The inlet 104 is positioned so as to draw in water 5 from the body of water 3 in which the marine vessel is operated. The outlet 106 is positioned to return the water from the open loop circuit 100 back to the body of water 3. A pump 108 is fluidly connected within the open loop circuit 100 and pumps the water 5 from the body of water 3 into the inlet 104, through the open loop circuit 100, and back to the body of water 3 via the outlet 106. The water 5 is pumped via the pump 108 to a first heat exchanger 128, which is discussed further below.

By way of example, the conduits 102 may be combinations of hoses, pipes, through-holes, and passages through components (such as a heat exchanger as discussed below). The inlet 104 and/or the outlet 106 may be formed in a gearcase of a marine propulsion device 20 or provided as through-hole in a hull of the marine vessel in a conventional manner.

The open loop circuit 100, as well as a closed loop circuit 120 discussed below, each extend through the first heat exchanger 128. The first heat exchanger 128 is configured to exchange heat between the water 5 in the open loop circuit 100 and a heat transfer fluid 126 in the closed loop circuit 120. It should be recognized that, via the first heat exchanger 128, the water 5 in the open loop circuit 100 heats the heat transfer fluid 126 when warmer than the heat transfer fluid 126, and conversely cools the heat transfer fluid 126 when cooler than the heat transfer fluid 126. Additional information regarding heat exchangers and cooling circuits is provided in U.S. Pat. Nos. 5,004,042; 5,746,270; 6,748,906; and 7,094,118, which are incorporated by reference in their entireties.

With continued reference to FIG. 2, additional information is now provided regarding the closed loop circuit 120. The closed loop circuit 120 of FIG. 2 includes a first path 121a and a second path 121b formed by conduits 122. The conduits 122 may be similar to the conduits 102 of the open loop circuit 100. The first path 121a is shown to be fluidly connected within the closed loop circuit 120 in parallel to the second path 121b. Valves 54 are positionable in different valve positions to selectively open and close the first path 121a and the second path 121b within the closed loop circuit. In particular, a first valve 55a (here a four-way valve) is provided upstream of the conduits 122 for both the first path 121a and the second path 121b. The valve position of the first valve 55a therefore selects whether the heat transfer fluid 126 upstream of the first valve 55a is conveyed through the first path 121a, the second path 121b, or in certain embodiments both. A second valve 55b (here a three-way valve) is also provided downstream of the conduits 122 for both the first path 121a and the second path 121b, which similarly is positionable to control the flow from the first path 121a and the second path 121b.

The closed loop circuit 120 of FIG. 2 further includes a third path 121c and a fourth path 121d that are parallel to each other. A third valve 55c (here a three-way valve) is fluidly connected downstream of the first heat exchanger 128 and upstream of the first valve 55a, the third path 121c, and the fourth path 121d. The third valve 55c is positionable to control whether the heat transfer fluid 126 is conveyed to the third path 121c, and the fourth path 121d.

A pump 124 is also fluidly connected within the closed loop circuit 120 and pumps the heat transfer fluid 126 therethrough. The heat transfer fluid 126 may be water, another liquid such as a refrigerant used in air conditioning systems, a water-ethylene-glycol (WEG) mixture, or oil. As discussed above, the heat transfer fluid 126 is circulated through the closed loop circuit 120 to heat and cool a set of components 80 as needed. The components 80 discussed herein may include cold plates, water jackets or other manifolds in a manner known in the art that provide heat exchange between the component 80 and the heat transfer fluid 126 flowing therethrough. In addition to facilitating heat transfer, the use of cold plates, water jackets, manifolds, and/or the like also isolate and protect other portions of the component from exposure to the heat transfer fluid 126 (e.g., electronics, oil passages or reservoirs, exhaust passages). Similar to the discussion above with respect to the first heat exchanger 128, a given component 80 is cooled when the heat transfer fluid 126 provided thereto is cooler than that component 80 and is warmed when the heat transfer fluid 126 is warmer than that component 80. For simplicity, the present disclosure refers to providing the heat transfer fluid to the components or the heat transfer fluid flowing through the components irrespective of how heat is exchanged between the components and the heat transfer fluid.

The components 80 are fluidly connected, via first and second component ports CP1, CP2, within the closed loop circuit 120. Some of the components 80 are fluidly connected within the third path 121c and others within the fourth path 121d. Specifically, the sixth component C6 and the seventh component C7 discussed above (e.g., a battery and battery charger, respectively) are fluidly connected in series within the fourth path 121d. An additional component 81 is provided within the third path 121c, whereby the third path 121c is provided in parallel to the fourth path 121d. The additional component 81 may include one or more of the other components 80 discussed above. By way of example, the additional component 81 is one or more motors (e.g., powerheads 22 of an electric or hybrid marine propulsion device 20 as shown in FIG. 1), one or more powertrain components (e.g., a multi-speed transmission 28 or gearset 30), and/or other components of a power distribution unit (e.g., part of the power local power systems 24 integrated with the marine propulsion devices 20, the central power system 44 positioned in the marine vessel 1, or a combination thereof). It should be recognized that the additional component 81 is merely representative of further components 80 and circuits that receive the heat transfer fluid 126 within the closed loop circuit 120. In this manner, the additional component 81 need not be connected in parallel to the sixth component C6 and the seventh component C7. Likewise, the additional component 81 may present additional series and/or parallel branches of conduits 122 within the closed loop circuit 120.

With continued reference to FIG. 2, the pump 124 causes the heat transfer fluid 126 to flow through the closed loop circuit 120 in a counterclockwise direction. The sequence that the components 80 are connected within the closed loop circuit 120 may be selected based on the required or optimal operating temperatures of these components. For example, a battery as the sixth component C6 may require lower operating temperatures than a battery charger as the seventh component C7. Positioning the sixth component C6 upstream of the seventh component C7 therefore advantageously provides cooler temperatures of the heat transfer fluid 126 to the sixth component C6 after passing through the first heat exchanger 128.

The direction and flow rate in which the heat transfer fluid 126 flows through the closed loop circuit 120 may also be variable, such as reversing the direction when the components 80 require heating versus cooling. Additional information regarding control systems for controlling the operation of various pumps and valves within the thermal management system 10 is provided below.

A second heat exchanger 130 is fluidly connected within the second path 121b and configured to cool or heat the heat transfer fluid via exchange heat within the second heat exchanger 130. The second heat exchanger 130 of FIG. 2 is a radiator 132 configured to exchange heat between the heat transfer fluid 126 and the atmosphere (e.g., ambient air) in a manner known in the art. A fan 134 is also provided to further increase the heat exchange by the radiator 132. By way of example, the fan 134 and the radiator 132 may be configured to vent directly out of a bilge of the marine vessel via a designated vent or vented into the bilge air to later be removed by a conventional bilge blower. In other examples (see e.g., FIG. 9), the second heat exchanger 130 is configured to exchange heat between the heat transfer fluid 126 and another gas or liquid, for example a refrigeration system 140 known in the art. By way of example, the refrigeration system 140 may comprise a compressor and an evaporator for cooling a refrigerant within conduits 144, which may circulate R134a, R1234yf, or other refrigerants.

In this manner, the heat transfer fluid 126 in the closed loop circuit 120 may be advantageously heated or cooled based on temperature differences with the water 5 from the open loop circuit 100 and/or temperature differences with the atmosphere 7. Specifically, the heating or cooling of components 80 via the heat transfer fluid 126 may be controlled by varying the valve positions of the valves 54, the operation of the pump 108 and the pump 124, and/or the fan 134, such as via a control system 200.

Figure 10:
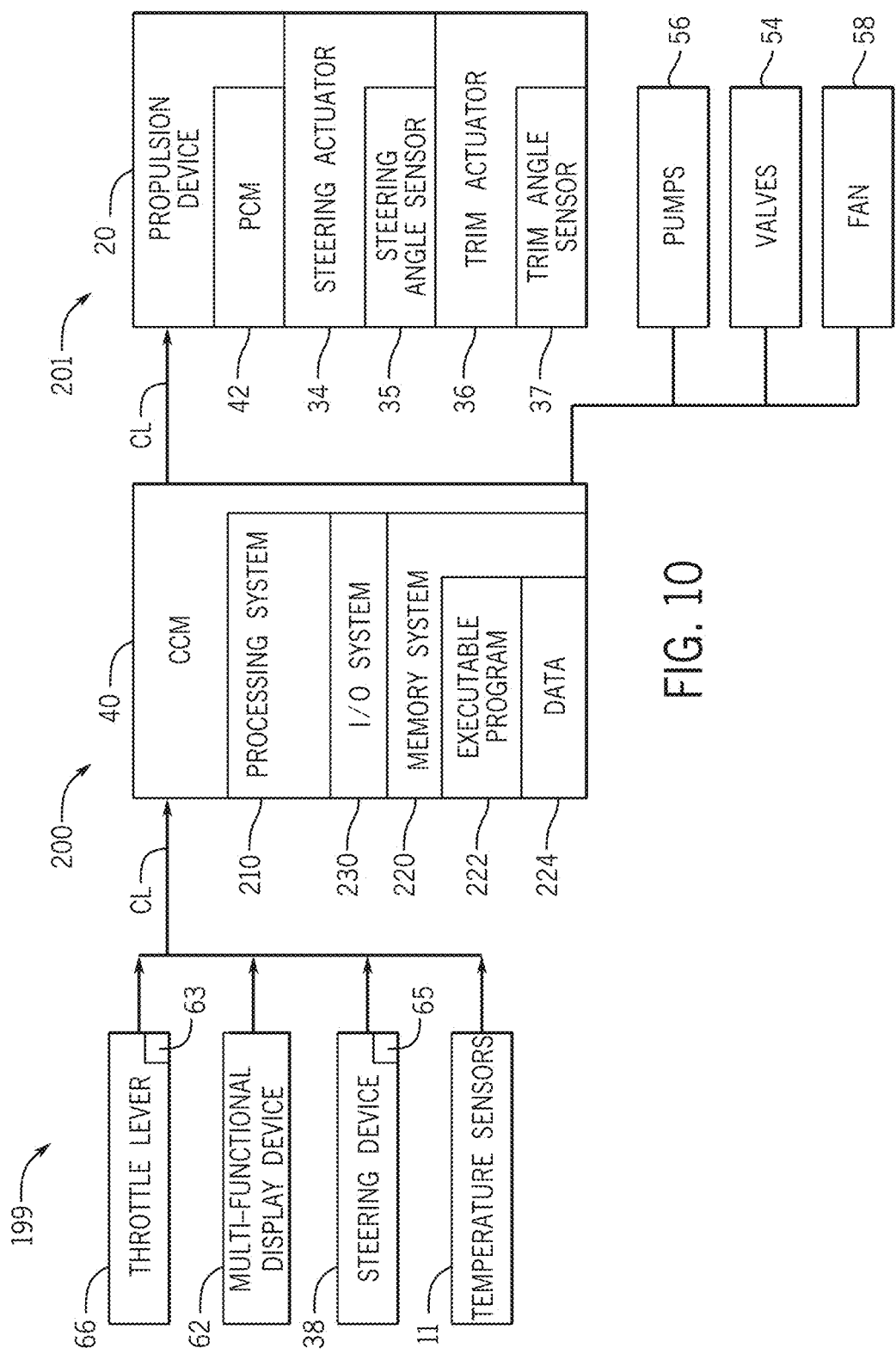
FIG. 10 is a schematic view of a control system for operating a thermal management system according to the present disclosure.

Additional information is now provided for the control system 200. With reference to FIG. 10, the control system 200 includes subsystems therein, such as one or more central control modules 40, one or more propulsion control modules 42, the helm controller 68, and/or other controllers discussed above and shown in FIG. 1. A person of ordinary skill in the art will recognize that these subsystems may also be present within additional central control modules 40 (as applicable) and/or propulsion control modules 42 or other controllers within the marine vessel 1. In the example shown, each central control module 40 includes a processing system 210, which may be implemented as a single microprocessor or other circuitry or be distributed across multiple processing devices or sub-systems that cooperate to execute the executable program 222 from the memory system 220. Non-limiting examples of the processing system include general purpose central processing units, application specific processors, and logic devices.

Each central control module 40 further includes a memory system 220, which may comprise any storage media readable by the processing system 210 and capable of storing the executable program 222 and/or data 224. The memory system 220 may be implemented as a single storage device or be distributed across multiple storage devices or subsystems that cooperate to store computer readable instructions, data structures, program modules, or other data. The memory system 220 may include volatile and/or non-volatile systems and may include removable and/or non-removable media implemented in any method or technology for storage of information. The storage media may include non-transitory and/or transitory storage media, including random access memory, read only memory, magnetic discs, optical discs, flash memory, virtual memory, and non-virtual memory, magnetic storage devices, or any other medium which can be used to store information and be accessed by an instruction execution system, for example. An input/output (I/O) system 230 provides communication between the control system 200 and peripheral devices, such as input devices 199 and output devices 201, which are discussed further below. The IO system 230 communicates via wires and/or wirelessly via input devices 199 and/or output devices 201, or with other elements of the control system 200. In practice, the processing system 210 loads and executes an executable program 222 from the memory system 220, accesses data 224 stored within the memory system 220, and directs the thermal management system 10 to operate as described in further detail below.

A person of ordinary skill in the art will recognize that these subsystems within the control system 200 may be implemented in hardware and/or software that carries out a programmed set of instructions. As used herein, the term "central control module" may refer to, be part of, or include an application specific integrated circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip (SoC). A central control module may include memory (shared, dedicated, or group) that stores code executed by the processing system. The term "code" may include software, firmware, and/or microcode, and may refer to programs, routines, functions, classes, and/or objects. The term "shared" means that some or all code from multiple central control modules may be executed using a single (shared) processor. In addition, some or all code from multiple central control modules may be stored by a single (shared) memory. The term "group" means that some or all code from a single central control module may be executed using a group of processors. In addition, some or all code from a single central control module may be stored using a group of memories. One or more central control module 40 may together constitute a control system 200 and may be located anywhere on the marine vessel 1.

A person of ordinary skill in the art will understand in light of the disclosure that the control system 200 may include a differing set of one or more control modules, or control devices, which may include engine control modules (ECMs) or propulsion control modules 42 for each marine propulsion device 20 (which, when applicable, may be referred to as ECMs even if the marine propulsion device 20 contains an electric motor in addition to or in place of an internal combustion engine), one or more thrust vector control modules (TVMs), one or more helm control modules (HCMs), and/or the like. Likewise, certain aspects of the present disclosure are described or depicted as functional and/or logical block components or processing steps, which may be performed by any number of hardware, software, and/or firmware components configured to perform the specified functions. For example, certain embodiments employ integrated circuit components, such as memory elements, digital signal processing elements, logic elements, look-up tables, or the like, configured to carry out a variety of functions under the control of one or more processors or other control devices.

The control system 200 communicates with each of the one or more components of the marine vessel 1 via a communication link CL, which can be any wired or wireless link. The illustrated communication link CL connections between functional and logical block components are merely exemplary, which may be direct or indirect, and may follow alternate pathways. The control system 200 is capable of receiving information and/or controlling one or more operational characteristics of the marine vessel 1 and its various sub-systems by sending and receiving control signals via the communication links CL. In one example, the communication link CL is a controller area network (CAN) bus; however, other types of links could be used. It will be recognized that the extent of connections and the communication links CL may in fact be one or more shared connections, or links, among some or all of the components in the marine vessel 1. Moreover, the communication link CL lines are meant only to demonstrate that the various control elements are capable of communicating with one another, and do not represent actual wiring connections between the various elements, nor do they represent the only paths of communication between the elements. Additionally, the marine vessel 1 may incorporate various types of communication devices and systems, and thus the illustrated communication links CL may in fact represent various different types of wireless and/or wired data communication systems.

As will be discussed further below, the control system 200 communicates with input devices 199 from various components such as steering devices, for example via sensors 63, 65 that detect the positions of the throttle lever 66, and the steering device 38, respectively. The control system 200 also communicates with other input devices 199, such as the multi-functional display device 62, the GPS 50, the IMU/AHRS 52, and temperature sensors 11 that measure temperatures of the components 80, the water 5, the heat transfer fluid 126, or elements of the thermal management system 10.

The control system 200 also communicates with output devices 101 such as propulsion control modules 42, steering actuators 34, and trim actuators 36, as well as the pumps 56 (e.g., pumps 108, 124), valves 54 (e.g., first valve 55a, second valve 55b, third valve 55c), and fans 58 (e.g., 134) described above. It will be recognized that the arrows shown are merely exemplary and that communication may flow in multiple directions. For example, the multi-functional display device 62 may serve as both an input device 199 for the operator to provide commands, and an output device 101 to display information transmitted from the central control module 40.

Returning to FIG. 2, the thermal management system 10 is shown operating in a first mode, which provides cooling for all components 80 shown, including the sixth component C6, the seventh component C7, and the additional component 81 (e.g., a powerhead 22, or a powertrain components such as a multi-speed transmission 28 or gearset 30). The first mode may be advantageously used when the marine vessel is underway in standard conditions (e.g., typical temperatures ranges for the body of water and components). In this case, it is advantageous for the thermal management system 10 to provide the necessary cooling with minimal noise, providing an improved operator experience. Specifically, the third valve 55c permits the heat transfer fluid 126 to flow through both the third path 121c and the fourth path 121d, thereby providing cooling to the additional components 81 (e.g., components of the drivetrain) and also the sixth component C6 and the seventh component C7 (e.g., a battery and battery charger). As discussed above, the battery may be used to provide power for propelling the marine vessel, and/or may be used for powering other devices.

The first valve 55a is positioned such that the heat transfer fluid 126 received from both the third path 121c and the fourth path 121d are conveyed to the first path 121a, but not to the second path 121b. In other words, the heat transfer fluid bypasses the second heat exchanger 130 as sufficient cooling may be provided via heat exchange in the first heat exchanger 128. The second valve 55b is also positioned so as to provide flow from the first path 121a and not from the second path 121b. This prevents a backflow of water from the first path 121a to the second path 121b.

Figure 3:
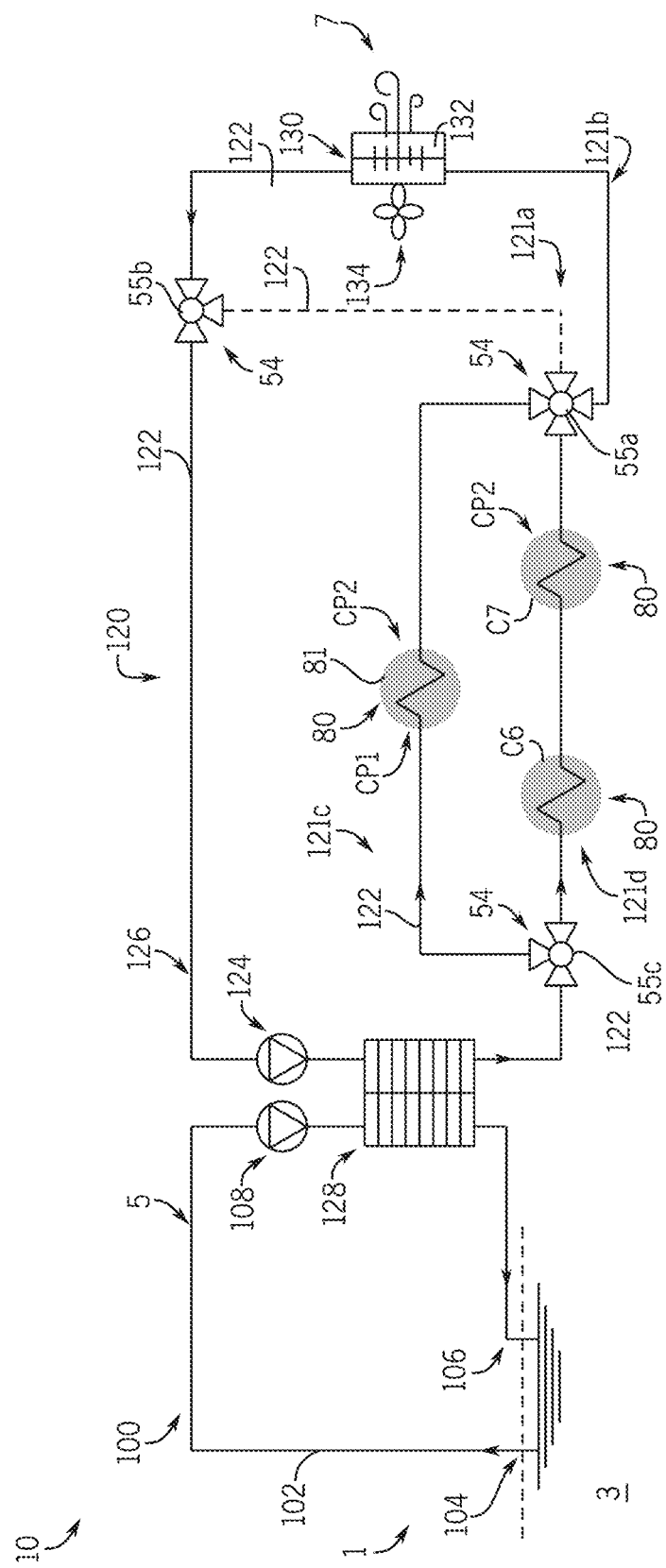
FIG. 3 is schematic view of the thermal management system from FIG. 2 in a second operating mode.

FIG. 3 shows the thermal management system 10 of FIG. 2 in a second mode. Cooling is shown to be provided for the components 80 in both the third path 121c and the fourth path 121d. Relative to the first mode shown in FIG. 2, the first valve 55a has been positioned in FIG. 3 such that the heat transfer fluid 126 is conveyed through the second path 121b rather than through the first path 121a. This causes the heat transfer fluid 126 to pass through the second heat exchanger 130, shown here as a radiator 132. The fan 134 may also be operated to maximize the heat exchange between the heat transfer fluid 126 and the atmosphere 7 via the radiator 132. The heat transfer fluid 126 also continues to circulate through the first heat exchanger 128 to exchange heat with the water 5 from the body of water 3 therein. In this manner, the second mode of operating the thermal management system provides additional or enhanced cooling for the components 80 by exchanging heat with both the first heat exchanger 128 and the second heat exchanger 130.

The second mode may be advantageously used when enhanced cooling is needed while the marine vessel 1 is in the water, including while the marine vessel is underway. By way of example, the additional cooling may be needed due to a higher temperature of the body of water 3 and/or higher temperatures or demand of the components 80.

Figure 4:
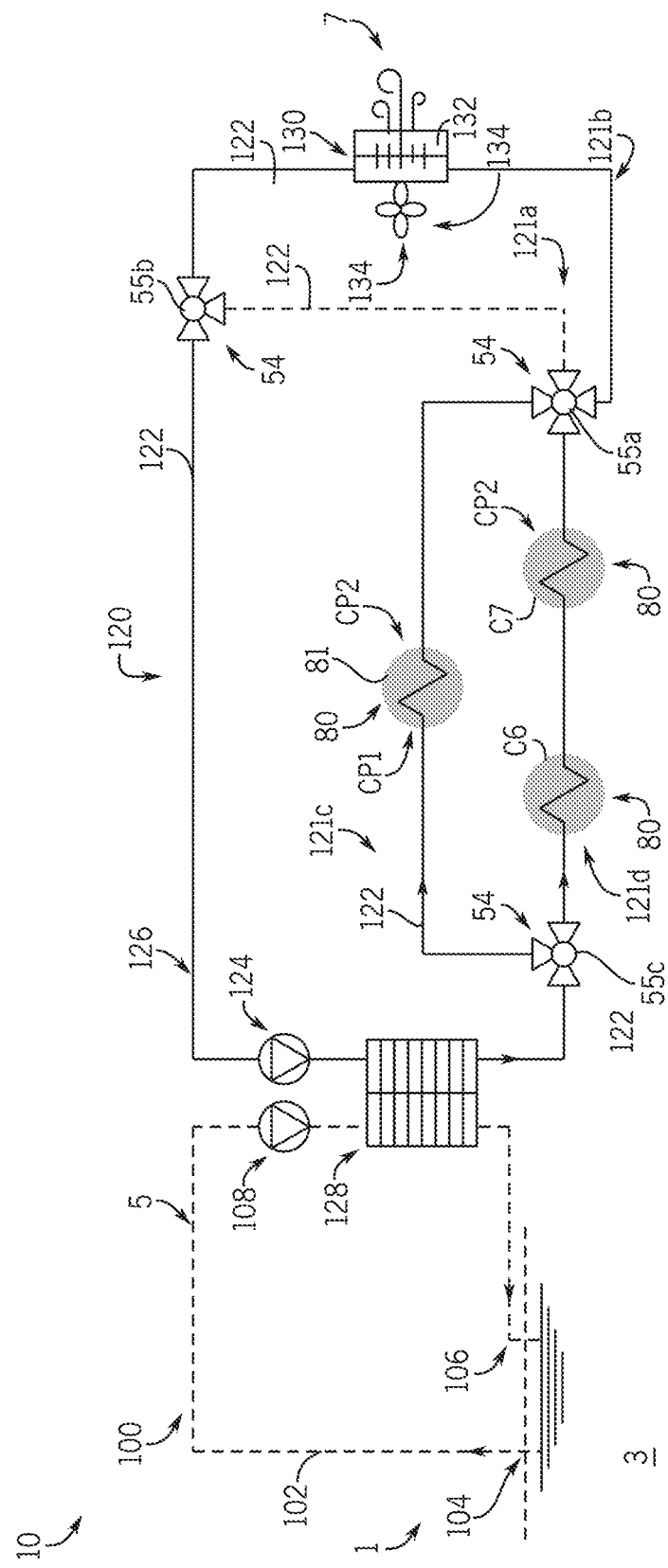
FIG. 4 is schematic view of the thermal management system from FIG. 2 in a third operating mode.

FIG. 4 shows the thermal management system 10 of FIG. 2 in a third mode. Cooling is shown to be provided for the components 80 in both the third path 121c and the fourth path 121d. Relative to the second mode shown in FIG. 3, the control system 200 (FIG. 10, discussed above) no longer operates the pump 108 and/or closes valves within the open loop circuit 100 such that the water 5 no longer circulates through the open loop circuit 100. As such, there is no appreciable heat exchange between the heat transfer fluid 126 and the water 5 within the first heat exchanger 128. Instead, the heat transfer fluid 126 is cooled via heat exchange with the atmosphere 7 (and/or another fluid such as a refrigerant 142 as shown within the configuration of FIG. 9) via the second heat exchanger 130.

The third mode may be advantageously used in circumstances in which the marine vessel 1 is operated out of the water while the ignition is on (e.g., diagnostics testing). In this manner, heat exchange is still provided for all components 80, including additional components 81 such as the motor of a powerhead 22, even when water 5 from the body of water 3 cannot be used.

Figure 5:
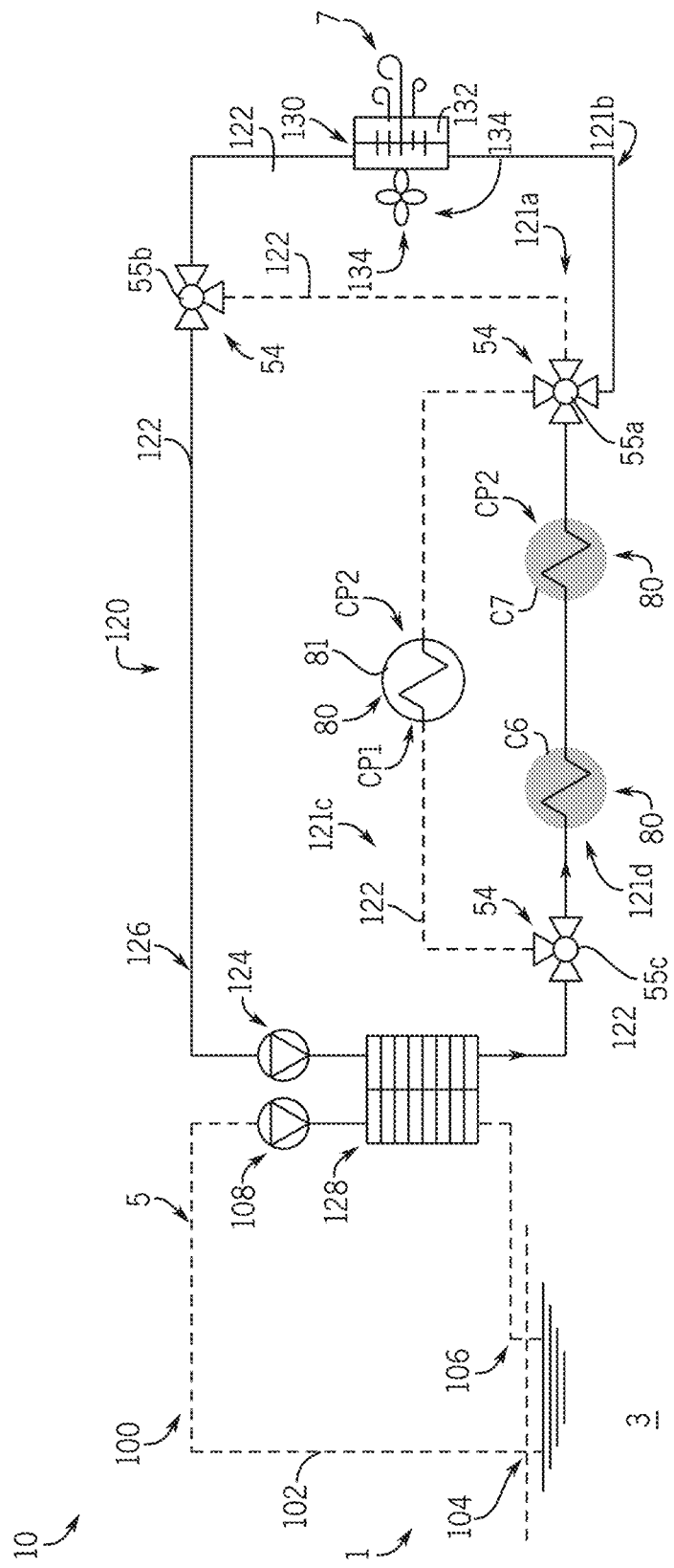
FIG. 5 is schematic view of the thermal management system from FIG. 2 in a fourth operating mode.

FIG. 5 shows a fourth operating mode that is similar to the third operating mode of FIG. 4, but where cooling is not needed for the components in the third path 121c. Specifically, the third valve 55c (and in certain embodiments the first valve 55a) are positioned so as to convey the heat transfer fluid 126 through the fourth path 121d to cool the components 80 therein, while also preventing the heat transfer fluid 126 to being conveyed through the third path 121c. The heat transfer fluid 126 exchanges heat via the second heat exchanger 130 within the second path 121b as discussed above. In this manner, the entire volume of heat transfer fluid 126 is provided to the components 80 in the fourth path 121d to receive the maximum cooling available via the second heat exchanger 130 acting alone.

The fourth mode may be advantageously used when the marine vessel 1 is out of the water, and particularly while the batteries (e.g., sixth component C6) are being charged by the battery charger (e.g., seventh component C7). As described above, this allows the marine vessel 1 to be removed from the water despite also needing to providing cooling for the batteries, battery chargers, and/or other related components.

Figure 6:
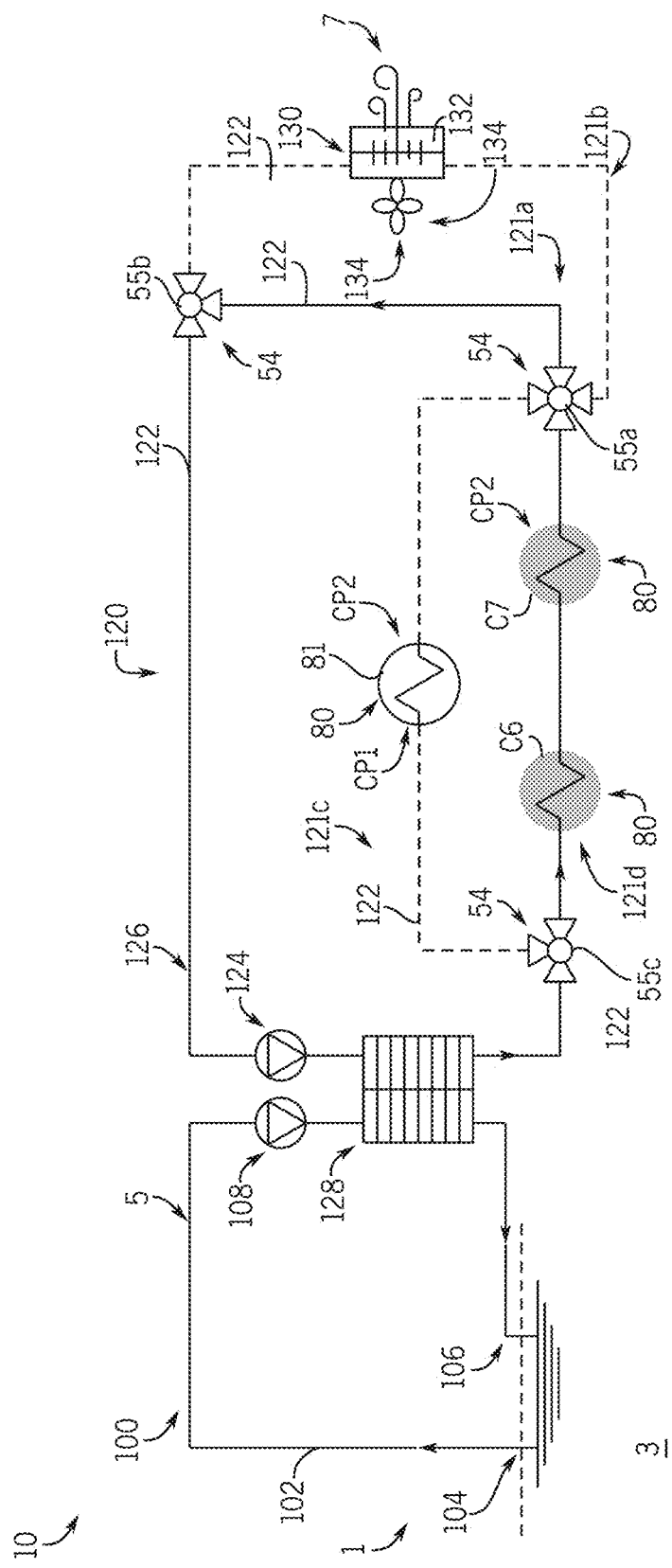
FIG. 6 is schematic view of the thermal management system from FIG. 2 in a fifth operating mode.

FIG. 6 shows a fifth operating mode that is similar to the fourth operating mode of FIG. 5 in that cooling is not needed for the components in the third path 121c. However, the fifth mode once again utilizes the body of water 3 for providing heat exchange with the heat transfer fluid 126 (i.e., via pumping the water 5 through the first heat exchanger 128). The third valve 55c (and in certain embodiments the first valve 55a) are positioned so as to convey the heat transfer fluid 126 through the fourth path 121d to cool the components 80 therein, while also preventing the heat transfer fluid 126 to being conveyed through the third path 121c. The valve position of the first valve 55a also provides that the heat transfer fluid 126 is no longer conveyed to the second path 121b, but instead is conveyed to the first path 121a to bypass the second heat exchanger 130. The second valve 55b may also be positioned to prevent flow to and/or from the second path 121b. In this manner, heat exchange for the heat transfer fluid 126 is provided via the first heat exchanger 128 and not from the second heat exchanger 130. Since the second heat exchanger 130 is not being utilized, the fan 134 is not operated.

The fifth mode may be advantageously used when charging the batteries (e.g., sixth component C6) via the battery charger (e.g., seventh component C7) when the marine vessel is in the water, and operating under standard conditions (e.g., typical temperatures ranges for the body of water and components). The control system 200 is configured to automatically transition between the fifth mode of FIG. 6 and the fourth mode of FIG. 5 when the availability of water 5 from the body of water 3 changes, such as the marine vessel being moved in and out of the water. Additional information regarding systems and methods for determining whether the marine vessel is in a body of water is provided in U.S. Pat. Nos. 8,864,538 and 8,944,865, which are incorporated by reference in their entireties herein.

The control system 200 may also be configured to automatically transition between the fifth mode of FIG. 6 and the fourth mode of FIG. 5 depending on the particular cooling needs of the components 80 and the ability of the first heat exchanger 128 and the second heat exchanger 130 is satisfying these needs. By way of example, high ambient temperature may result in the second heat exchanger 130 not providing sufficient cooling alone, thereby causing the thermal management system 10 to transition to the fifth mode of FIG. 6 or a mode in which both the first heat exchanger 128 and the second heat exchanger 130 are used together. Additional information regarding the temperature controls for batteries, engines (e.g., powerheads), and other components is also provided in U.S. Pat. Nos. 7,975,637 and 9,403,588, which are incorporated by reference in their entireties herein. It should be recognized that while the present disclosure primarily discusses the control system 200 automatically transitioning between different modes, as well as automatically controlling valves, pumps, fans, and the like, the present disclosure also contemplates manual controls, a mixture of manual and automatic controls, automatic controls that can be overridden for manual control, and the like.

Figure 7:
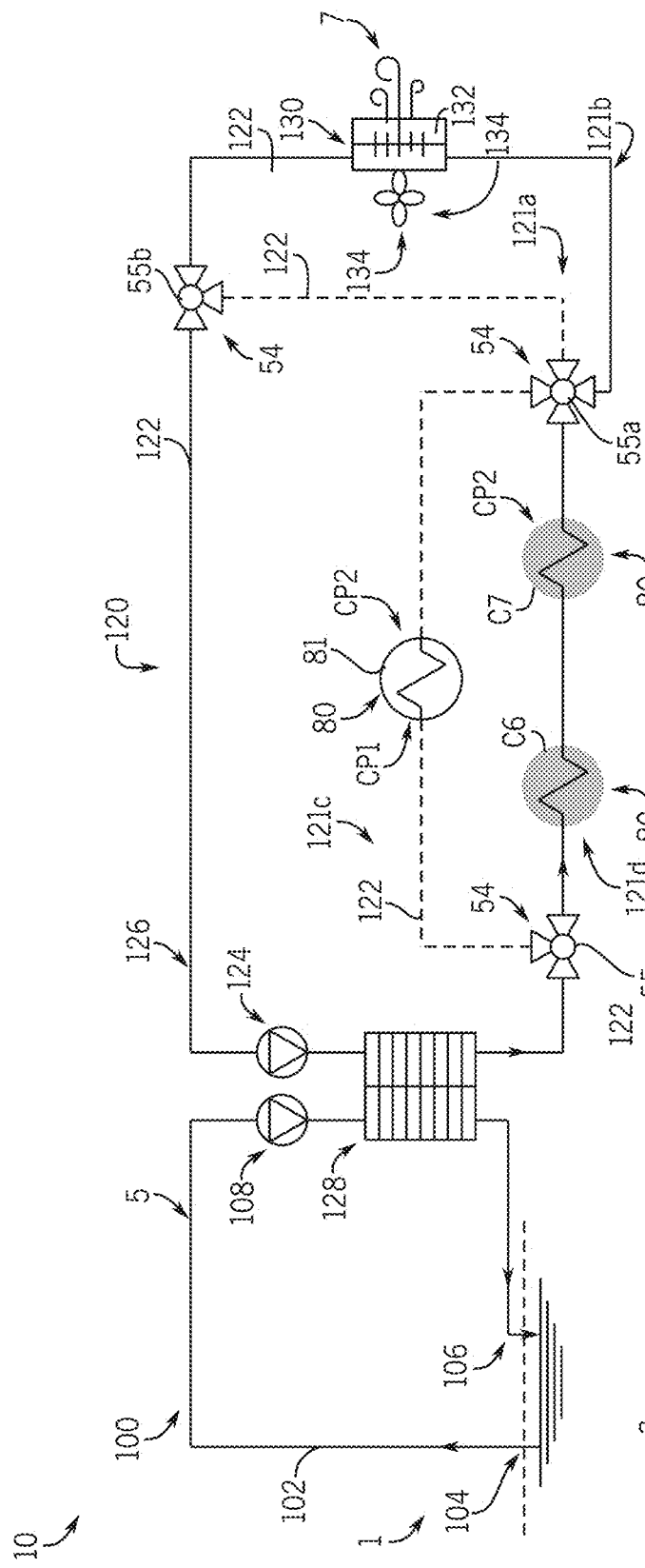
FIG. 7 is schematic view of the thermal management system from FIG. 2 in a sixth operating mode.

FIG. 7 shows a sixth operating mode that is similar to the fifth operating mode of FIG. 6 in that cooling is not needed for the components in the third path 121c. However, in contrast to FIG. 6, the thermal management system 10 of FIG. 7 has the first valve 55a and the second valve 55b positioned such that the heat transfer fluid 126 is conveyed through the second path 121b instead of through the first path 121a. Therefore, the heat transfer fluid 126 now exchanges heat via the second heat exchanger 130 in addition to via the first heat exchanger 128.

The sixth mode may be advantageously used when charging the batteries (e.g., sixth component C6) via the battery charger (e.g., seventh component C7) when the marine vessel is in the water, and particularly when enhanced cooling is needed for the components similar to described above for FIG. 3. By way of example, the fifth mode may be used for warmer climates when the ambient air and/or the body of water are particularly warm. In certain configurations, continuous operation over 25° C. can shorten the lifespan of some battery chemistries. Thus, supplemental cooling is advantageous where the raw water exceeds 25° C. or cannot otherwise cool the battery below 25° C. It should be recognized that this value is merely exemplary and varies by battery chemistry and the like. The fifth mode is also advantageous to provide enhanced cooling during faster charging rates, such as when enabling DC fast charging, which generates more heat than standard charging rates.

Figure 9:
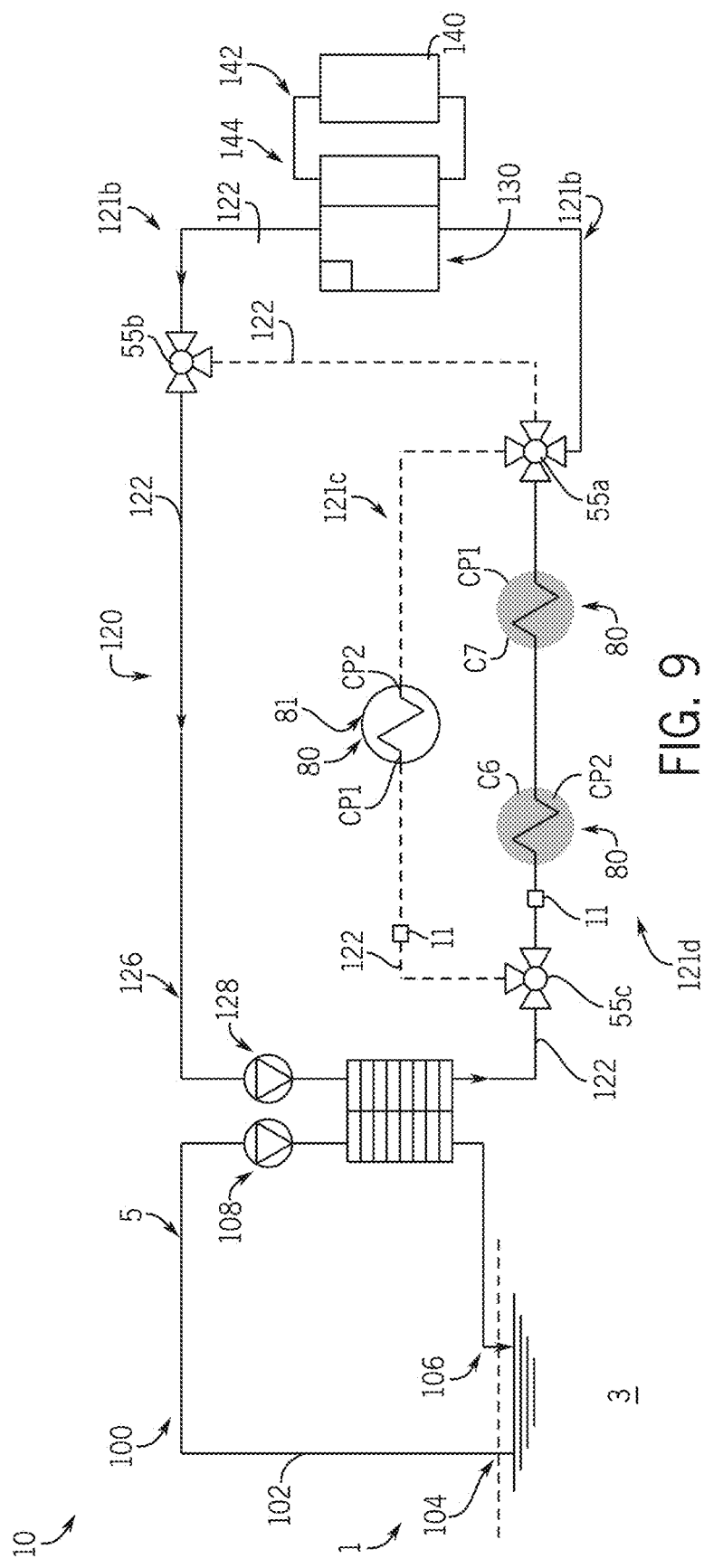
FIG. 9 is a schematic view of another embodiment of a thermal management system according to the present disclosure.

An alternative embodiment of thermal management system 10 shown in an operating mode similar to that of FIG. 7 is shown in FIG. 9. The thermal management system 10 of FIG. 9 has a second heat exchanger 130 that is not a radiator, but instead exchanges heat between the heat transfer fluid 126 and a refrigerant 142 circulating via conduits 144 with a refrigeration system 140 known in the art. In this manner, the second heat exchanger 130 may be similar to the first heat exchanger 128, each passing two fluids therethrough to exchange heat therebetween. The refrigeration system 140 may be variably operated depending on the cooling needs of components within the thermal management system 10. By way of example, the flow rate or duty cycle of the refrigerant system 140 may vary based on readings of one or more temperature sensors 11.

Figure 8:
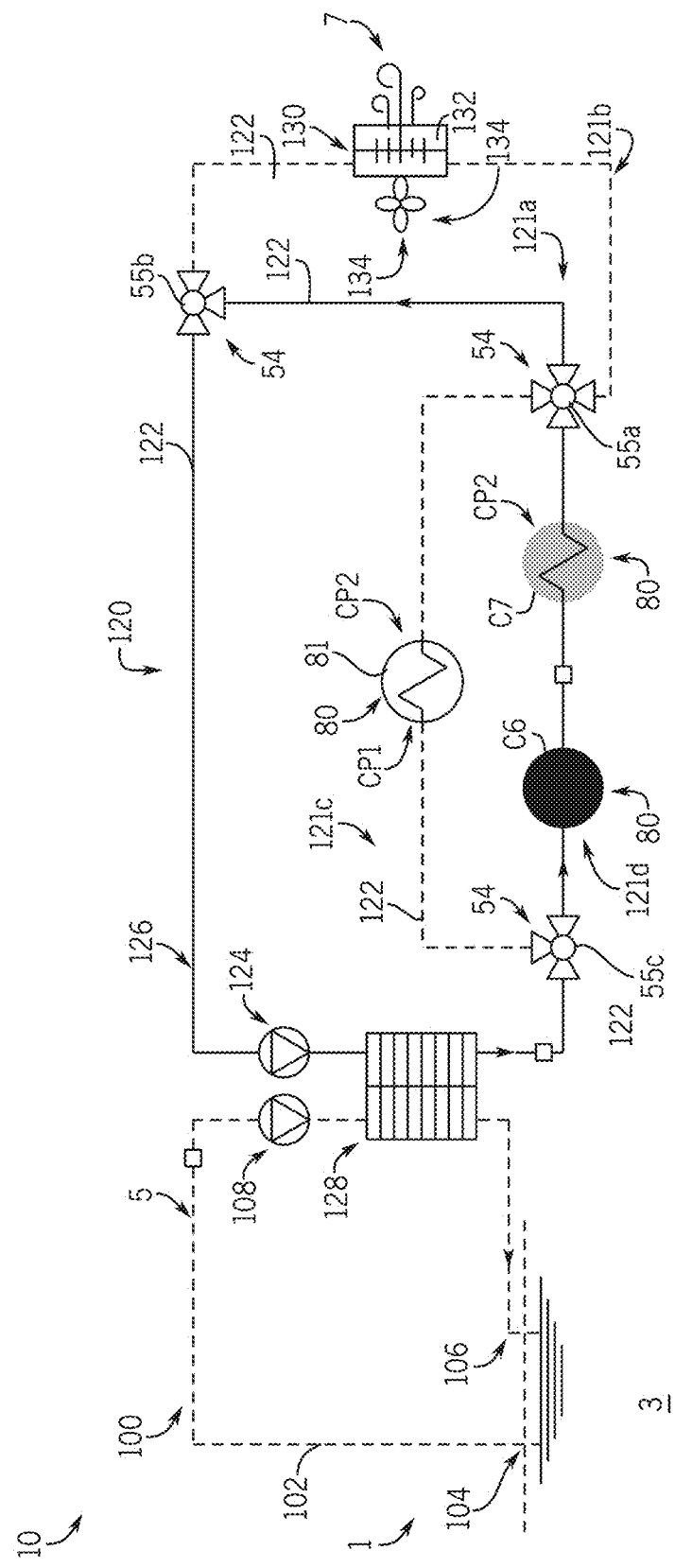
FIG. 8 is schematic view of the thermal management system from FIG. 2 in a seventh operating mode.

As discussed above, the thermal management systems 10 disclosed herein are configured to provide heat exchange for components via heat exchange with a heat transfer fluid 126 conveyed thereto. FIG. 8 shows an example particularly demonstrating a use in which heating is required for one or more components 80, here shown as a seventh mode of the same thermal management system 10 of FIGS. 2-7. The first valve 55a, the second valve 55b, and the third valve 55c are each positioned similarly to the configuration shown in FIG. 6, whereby the heat transfer fluid 126 is conveyed through the first path 121a and the fourth path 121d and prevented from flowing through the second path 121b and the third path 121c. Therefore, no heat exchange is provided with the additional components 81, nor with the second heat exchanger 130. Additionally, the pump 108 is disabled similar to that described for the configurations of FIGS. 4 and 5 such that heat is not exchanged between the heat transfer fluid 126 and water 5 from the body of water 3 within the first heat exchanger.

The seventh mode of FIG. 8 may be advantageously used when the batteries (e.g., sixth component C6) requiring warming for optimal operation, including when charging. In view of this, FIG. 8 shows the sixth component C6 in black to indicate a need for heating, whereas the seventh component C7 is shown in grey to indicate a need for cooling (here corresponding to the battery charger). The additional component 81 is again shown in white to indicate no heat exchange in the present mode.

With the valves (55a, 55b, 55c) and pumps (108, 124) controlled as shown and described above, the heat transfer fluid 126 circulates throughout the closed loop circuit 120 without exchanging any heat with the first heat exchanger 128 or the second heat exchanger 130. As such, the heat transfer fluid 126 is heated by passing through the seventh component C7, which is then used to heat the sixth component C6. This seventh mode is energy efficient in that the pump 108 of open loop circuit 100 and the fan 134 of the closed loop circuit 120 (or the refrigeration system 140 of FIG. 9) need not operate to provide heating to the sixth component C6 or cooling to the seventh component C7. It should be recognized that this seventh mode can also be used irrespectively of whether the marine vessel is in the water since cooling is not being provided from therefrom. The control system 200 may then transition the valves and pumps to another mode when the battery is sufficiently warm, for example the modes of FIG. 5 or 6 depending upon whether the marine vessel is determined to be in the water.

Figure 11A:
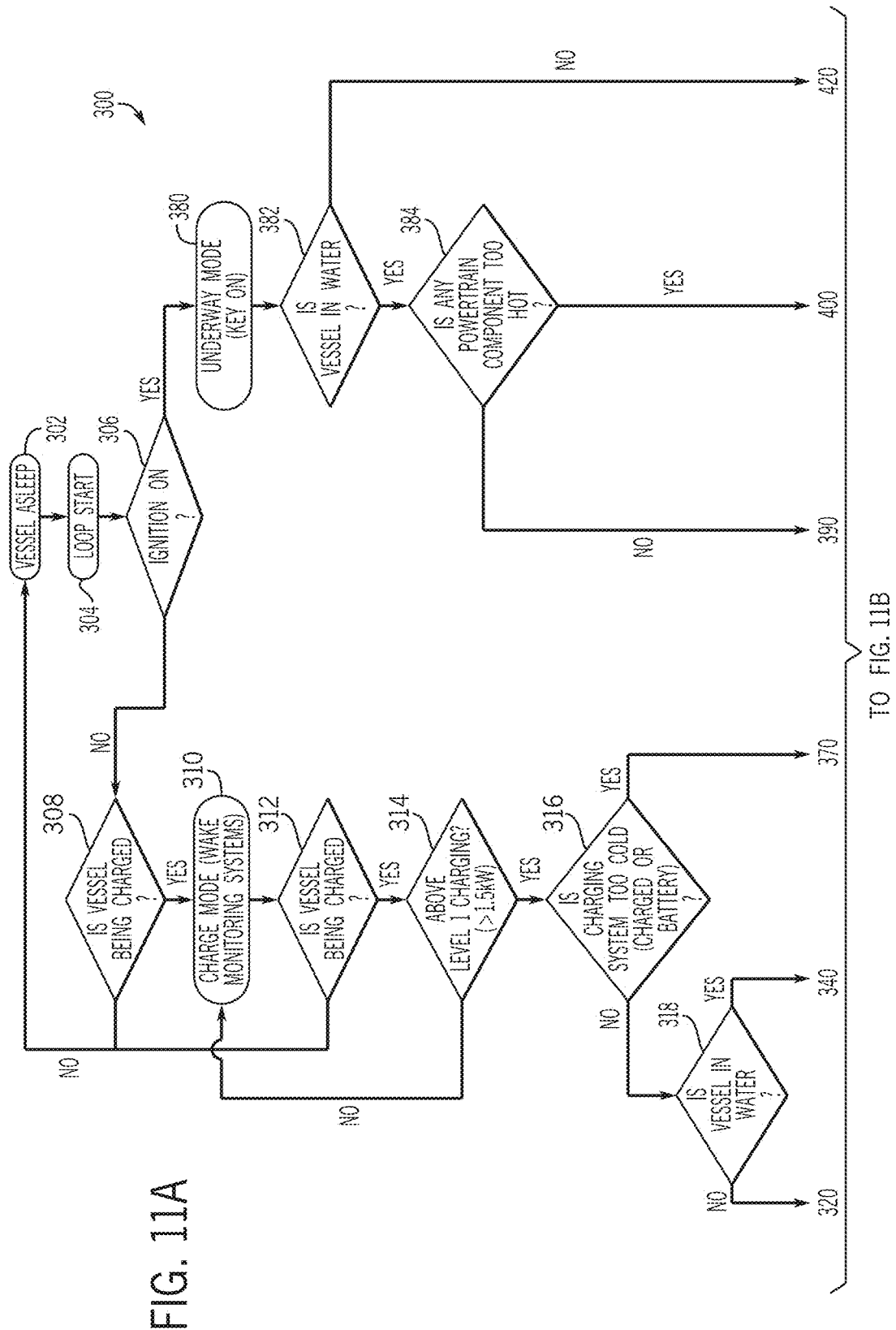
FIGS. 11A-11B depict a process for operating a thermal management system according to the present disclosure.
Figure 11B:
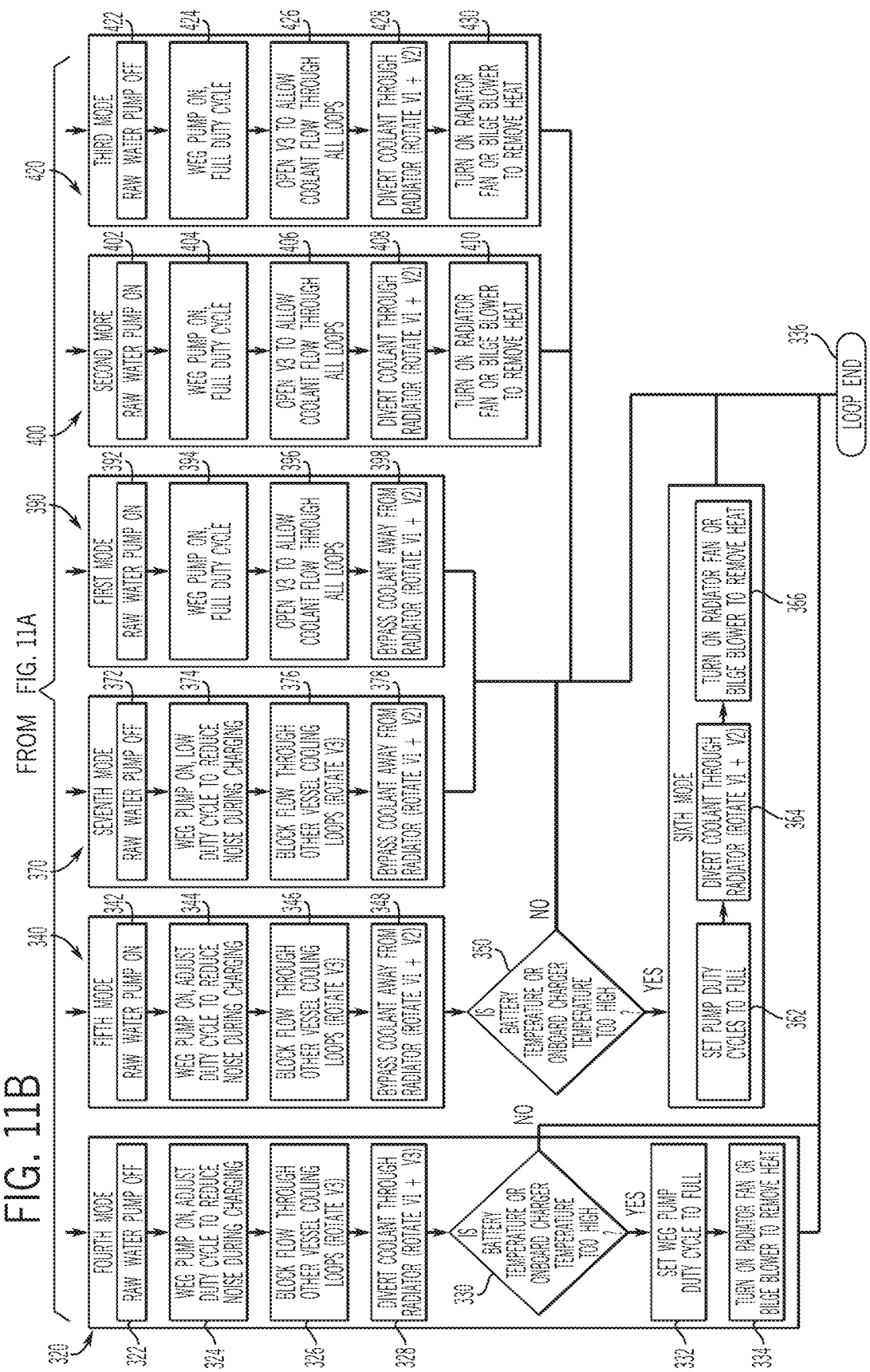

FIGS. 11A-11B show an exemplary process 300 for operating a thermal management system or otherwise heating and cooling components in a marine vessel according to the present disclosure. It should be recognized that the first valve 55a, second valve 55b, and third valve 55c are also referred to as V1, V2, V3, respectively, for simplicity. The marine vessel is show to begin asleep in step 302 with the logical loop starting in step 304. Step 306 queries whether the ignition of the marine vessel is on. If the ignition is off, step 308 queries whether the marine vessel (or the batteries thereof) are being charged. If the batteries are not being charged, the process returns to step 302. If the batteries are being charged, the thermal management system is in a charge mode and step 310 provides continued monitoring.

Step 312 queries whether the marine vessel is still being charged. If not, the process returns to step 302. If instead the marine vessel is still charging, step 314 queries whether the system is charging a high charge rate (e.g., DC fast charging, greater than 1.5 kW). If the system if found to be charging at a standard rate (not about "Level 1" charging), the process returns to step 310 to continue monitoring. If instead the system is charging at a high rate in step 314, step 316 queries whether the charging system is too cold (e.g., requires heating for the battery charger and/or battery). If the battery and/or battery charger is not too cold, step 318 queries whether the marine vessel is in the water, determined in a manner described above. In certain configurations, operation at any battery temperature lower than about 20° C. can result in some loss of capacity or charge/discharge capability, whereas keeping the battery warm requires discharging itself. Therefore, by way of example, it may be advantageous to maintain the battery around 10° C. whereby the energy spent to keep the battery warm is worth the increase in useable capacity.

If the marine vessel is not in the water, the thermal management system 10 is operated in the fourth mode 320 (e.g., as shown in FIG. 5). As shown in FIGS. 11B and 5 a, step 322 provides that the raw water pump (e.g., pump 108) is turned off and step 324 provides that the pump of the closed loop circuit 120 (e.g., pump 124 pumping WEG) is turned on with the duty cycle being adjustable to reduce noise during charging. Step 326 provides for blocking the flow of the heat transfer fluid 126 to other (non-charging) components by rotating a third valve accordingly (e.g., third valve 55c) and in step 318 diverting the heat transfer fluid 126 to the second heat exchanger 130 via rotating the first valve 55a and second valve 55b. Step 330 queries whether the battery and/or battery charger exceeds an upper threshold (e.g., a value between 50°–70° C., or 60° C.). If not, the process concludes with step 336 and monitoring continues. If instead the battery or battery temperature exceeds the upper threshold in step 330, the pump in the closed loop circuit operates at full to ensure maximum cooling in step 332. The fan 134 corresponding to the radiator 132 (or another air circulator such as a bilge blower) is also operated to maximize heat exchange in the second heat exchanger 130. The process again ends at step 336.

Returning to FIG. 11A, if instead in step 318 it is determined that the marine vessel is indeed in the water, the thermal management system 10 is operated in the fifth mode 340 (e.g., as shown in FIG. 6). As shown in FIG. 11B and FIG. 6, steps 342 through 350 process in a similar manner to steps 322 through 330 discussed above for the fourth mode 320, except that in the fifth mode the valves divert the heat transfer away from the radiator 132 instead of to the radiator 132. If in step 350 the temperatures of neither the battery nor the battery charger exceed an upper threshold, the process ends with step 336 and monitoring continues. If instead the upper threshold is exceeded in step 350, the process continues by automatically transitioning to the sixth mode (e.g., FIG. 7).

With reference to FIG. 11B and FIG. 7, the process continues with step 362, whereby the pump in the closed loop circuit 120 (and in certain embodiments the pump in the open loop circuit 100) operates at full to ensure maximum cooling. Step 364 repositions the first valve 55a and the second valve 55b such that the heat transfer fluid 126 is now conveyed also to the radiator 132. In step 366, the fan 134 corresponding to the radiator 132 (or another air circulator such as a bilge blower) is also operated to maximize heat exchange in the second heat exchanger 130. The process again ends at step 336.

Returning to FIG. 11A, if in step 316 it is determined that the charging system (battery and/or battery charger is too cold), the thermal management system 10 is operated in the seventh mode 370 (e.g., FIG. 8). As shown in FIG. 11B and FIG. 8, step 372 through step 376 proceed similarly to step 322 through 326 from the third mode 420. The pump in the closed loop circuit may be operated at a lower duty cycle in the seventh mode 370 than the fifth mode 340 to as to further reduce the noise during charging. In step 378, the first valve 55a and the second valve 55b are positioned such that the heat transfer fluid 126 bypasses the second heat exchanger 130, or in other words passes through the first path 121a rather than the second path 121b. The process ends at step 336 with additional monitoring.

Returning to FIG. 11A if instead it is determined in step 306 that the ignition is on, the thermal management system 10 is considered to be in underway mode with the "key on" in step 380. Step 382 queries whether the marine vessel is in the water, which if so leads to a query in step 384 whether any powertrain component is too hot (e.g., a powerhead 22, multi-speed transmission 28, gearset 30, and/or the like). If no powertrain component is too hot in step 384, the thermal management system 10 is operated in the first mode 390 (e.g., FIG. 2).

As shown in FIG. 11B and FIG. 2, step 392 begins with operating the pump 108 in the open loop circuit 100, as well as the pump 124 in the closed loop circuit 120. In step 396, the third valve 55c is positioned such that the heat transfer fluid 126 flows through both the third path 121c and the fourth path 121d. Step 398 provides for positioning the first valve 55a and the second valve 55b such that the heat transfer fluid 126 bypasses the second heat exchanger 130, similar to the fifth mode 340 and the seventh mode 370. The process ends at step 336 with additional monitoring.

Returning to FIG. 11A, if instead it is determined in step 384 that a powertrain component is too hot, the thermal management system 10 is operated in the second mode 400 (e.g., FIG. 3). As shown in FIG. 11B and FIG. 3, steps 402 through 406 proceed similarly to steps 392 through 396 discussed above for the first mode 390. Step 408 provides for positioning the first valve 55a and the second valve 55b so as to convey the heat transfer fluid 126 to the second heat exchanger 130, similar to step 328 discussed above. Step 410 provides for operating the fan 134 or another blower to remove heat from the radiator 132 as the second heat exchanger 130, similar to step 334 discussed above. The process ends at step 336 with additional monitoring.

Returning to FIG. 11A, if instead it is determined in step 382 that the marine vessel is indeed in the water, using methods discussed above, the thermal management system 10 is operated in the third mode 420 (e.g., FIG. 4). As shown in FIG. 11B and FIG. 4, step 422 provides for turning off the pump 108 in the open loop circuit 100 since the marine vessel is not in the water. Step 424 through step 430 then process similarly to step 404 through step 410 discussed for the second mode 400, ending with step 366 with additional monitoring.

In this manner, the presently disclosed systems and methods provide improved flexibility and performance for cooling components of a marine vessel, including supporting fast charging of batteries when the marine vessel is out of the water.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology can alternatively be represented as a series of interrelated states or events, such as in a state diagram. Moreover, not all acts illustrated in a methodology may be required for a novel implementation.

This written description uses examples to disclose the invention, including the best mode, and also to enable any person skilled in the art to make and use the invention. Certain terms have been used for brevity, clarity, and understanding. No unnecessary limitations are to be inferred therefrom beyond the requirement of the prior art because such terms are used for descriptive purposes only and are intended to be broadly construed. The patentable scope of the invention is defined by the claims and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

What is claimed is:

1. A thermal management system for a marine vessel, the thermal management system comprising:
   an open loop circuit;
   a first pump that pumps water from the body of water in which the marine vessel is operating, through the open loop circuit, and back to the body of water;
   a closed loop circuit including a first path and a second path parallel to each other;

a second pump that pumps a heat transfer fluid through the closed loop circuit;
a first heat exchanger configured to exchange heat between the water and the heat transfer fluid;
a second heat exchanger configured to exchange heat with the heat transfer fluid;
a first component and a second component heat configured to be cooled or heated by the heat transfer fluid, wherein the first component and the second component are downstream from the first heat exchanger and upstream from the second heat exchanger; and
one or more valves configured to select between conveying the heat transfer fluid via the second path of the closed loop circuit to the second heat exchanger and via the first path in the closed loop circuit to bypass the second heat exchanger to vary the cooling or heating of the first component and the second component, wherein the first component and the second component are provided in parallel so as to be cooled or heated independently of each other.

2. The thermal management system according to claim 1, wherein the second heat exchanger is a radiator configured to exchange heat between the heat transfer fluid and atmosphere.

3. The thermal management system according to claim 1, wherein the first component and the second component are fluidly connected within the closed loop circuit.

4. The thermal management system according to claim 1, wherein the first component and the second component are part of a plurality of components that comprise a battery and a battery charger.

5. The thermal management system according to claim 4, wherein the battery charger is fluidly connected downstream of the battery.

6. The thermal management system according to claim 4, wherein the battery charger is configured to charge the battery and the battery is configured to provide power to propel the marine vessel in the body of water, and wherein the heat transfer fluid cools or heats the battery and the battery charger when charging the battery while the marine vessel is out of the body of water.

7. The thermal management system according to claim 4, further comprising a control system configured to operate the one or more valves based upon whether the battery charger is charging the battery.

8. The thermal management system according to claim 1, further comprising a control system configured to operate the one or more valves based upon whether the marine vessel is out of the body of water.

9. The thermal management system according to claim 1, wherein the first component is a battery or a battery charger, further comprising a control system and a program executable thereby for operating the one or more valves based upon a temperature of at least one of the first component and the heat transfer fluid.

10. The thermal management system according to claim 9, further comprising a fan operable to increase heat exchange between the heat transfer fluid and the atmosphere via the second heat exchanger, wherein the control system is further configured to operate the first pump and the fan, and wherein the control system is configured to operate the one or more valves such that the heat transfer fluid is conveyed via the second path to the second heat exchanger and to operate the first pump and the fan to maximize heat exchange via the second heat exchanger when the first component requires maximum cooling and the marine vessel is in the body of water.

11. The thermal management system according to claim 1, further comprising a control system configured to operate the first pump and the one or more valves, and wherein the control system is configured to operate at least one of the first pump and the one or more valves based upon a temperature of the body of water.

12. The thermal management system according to claim 1, further comprising a control system and a program executable thereby for operating the first pump and the one or more valves, wherein the program provides for disabling the first pump when the first component requires heating.

13. The thermal management system according to claim 12, wherein the program further provides for operating the one or more valves such that the heat transfer fluid bypasses the second heat exchanger when the first component requires heating.

14. The thermal management system according to claim 1, wherein the one or more valves are further configured to select whether the heat transfer fluid is conveyed to the first component, to the second component, or both the first component and the second component to provide the cooling or heating thereto.

15. The thermal management system according to claim 1, further comprising a refrigeration system configured to cool the heat transfer fluid via the second heat exchanger.

16. The thermal management system according to claim 1, further comprising a control system configured to operate the first pump based upon whether the marine vessel is out of the body of water.

17. The thermal management system according to claim 1, wherein the first component comprises a battery charger, further comprising a control system and a program executable thereby for operating at least one of the first pump, the second pump, and the one or more valves based upon power consumption of the battery charger.

18. The thermal management system according to claim 1, wherein the heat transfer fluid is chemically different than the water from the body of water.

19. The thermal management system according to claim 1, wherein the one or more valves include a first valve that is downstream of the first component and upstream of the second heat exchanger and a second valve that is downstream of the second heat exchanger.

20. A thermal management system for a marine vessel, the thermal management system comprising:
an open loop circuit;
a first pump that pumps water from the body of water in which the marine vessel is operating, through the open loop circuit, and back to the body of water;
a closed loop circuit including a first path and a second path parallel to each other;
a second pump that pumps a heat transfer fluid through the closed loop circuit;
a heat exchanger configured to exchange heat between the water and the heat transfer fluid;
a radiator configured to exchange heat between the heat transfer fluid and atmosphere;
a plurality of components downstream of the heat exchanger, upstream of the radiator, and each cooled or heated by the heat transfer fluid, wherein the plurality of components comprises a battery and a battery charger, and wherein at least two components within the plurality of components are provided in parallel so as to be cooled or heated independently of each other;
one or more valves configured to select between conveying the heat transfer fluid via the second path of the closed loop circuit to the radiator and via the first path in the closed loop circuit to bypass the radiator to vary the cooling or heating of at least a portion of the plurality of components; and a control system and a program executable thereby for operating the one or more valves based upon whether the marine vessel is out of the body of water and whether the battery charger is charging the battery.

\* \* \* \* \*